UNITED STATES PATENT OFFICE 2,306,887

PROTECTIVE COVERING PASTE

Rudolf Klose, Eisenach, Germany; vested in the Alien Property Custodian

No Drawing. Application July 22, 1939, Serial No. 285,957. In Germany March 15, 1938

5 Claims. (Cl. 106—2)

This invention relates to pastes for covering the human skin or constructional elements for the purpose of protecting them against soiling by splashes of paint or the like. Such protective pastes are already known and these consist either of soap, gum arabic, lanoline or vaseline, glycerine and water, or else of pigments, wheat flour, sedimented chalk, and glycerine. The protective layers thus obtained can, if required, be washed off with water.

For the same purpose, articles have been greased but in such cases the covering must subsequently be removed by means of organic solvents.

The removal of these protective layers is, however, tedious and may cause damage to the surface which it is desired to protect. In cases where the pastes have to be washed off with water or organic solvents there is a risk of water getting into joints and side walls and there causing swellings or corrosions; or the foundation for the fat may be attacked by the organic solvents. If, however, a spatula is used in the removing operation, the varnished surface may suffer damage. If the pastes contain soap, the varnished article, when being washed with water, may be attacked by the soap. More particularly, when covering up artificial glass made of poly acrylic acid ester, the use of pastes containing pigments is impossible, because this artificial glass is so sensitive that scratches on the surface would be caused by the washing and the drying with a rag.

The known pastes are not suitable either in cases where parts have to be painted. In such cases, the pastes containing pigments would be either displaced or taken up by the bristles of the brush. Such pastes are not suitable either for covering the windows of vehicles or aircraft because they have a dimming effect. Finally the known pastes are not stable against bacteria.

The object of the present invention is to provide a protective paste which is free from these disadvantages and according to the invention the paste consists of a mixture of a film forming substance, for example cellulose derivatives, an oil, for example "paraffinum liquidum" or liquid paraffin, and a hygroscopic substance, for example glycerine containing a diluting agent, such as for example water.

Apart from cellulose ethers or esters, all similar substances, for example polymerisation products of acrylic acid esters, vinyl esters or the like, may be used as film forming substances. The liquid paraffin may be replaced by another oily or greasy substance, for example paraffin oil, linseed oil, wood oil, whale oil, spindle oil, lanoline or the like, which substances are herein classed as water-insoluble oils. Instead of glycerine another hygroscopic alcohol, for example glycol, may also be used.

A proven composition consists of

| | Grs. |
|---|---|
| Methyl cellulose, dissolved in water, dilution 1:14 | 500 |
| Liquid paraffin | 160 |
| Glycerine | 140 |

It is also possible to obtain a harder film by an addition of varnishes or waxes. In these cases the mixtures also obtain an addition of any desired varnish, for example of spirit varnish, oil varnish, nitrocellulose varnish, synthetic resin varnish, or chloro-rubber varnish, of natural or synthetic waxes, or paraffins. The following would be a suitable composition.

| | Grs. |
|---|---|
| Methyl cellulose, dissolved in water, dilution 1:14 | 500 |
| Liquid paraffin | 160 |
| Glycerine | 140 |
| Synthetic resin or paraffin dissolved in an organic solvent | 40 |

The compositions may vary within a wide limit. Under certain conditions an addition of 1 to 2% of glycerine or glycol may be sufficient.

The paste according to the invention offers the following advantages. It can easily be applied to any surface to be protected. It dries within a comparatively short period, whereupon it can easily and completely be peeled off as a coherent rubber like film. It leaves the article to be protected practically free from deposits, so subsequent cleaning is usually unnecessary. The paste when applied yields so resistant a film that it may be gone over with a brush without suffering damage.

It must be specially remarked that the paste is also suitable for covering artificial glass made of polyacrylic acid esters which was heretofore protected with covering strips and paper. When using varnishes containing acetone, the glass tarnished in spite of this protection, and corroded.

As the paste yields a comparatively firm film after drying, it may also be used as a substitute for stencil paper or aluminium foils. In this, it offers the special advantage that, unlike the papers and foils heretofore used, it need not be pasted in the first instance and dissolved off with water after the cutting out of the lettering or the like. Furthermore, it always adheres evenly on the surface, thus making it impossible for paint dust to penetrate under the cut-out letters. Furthermore, the composition of the paste is so chosen that it forms a dry film on the surface of the article to be covered, which film remains, however, dust-retaining for a long period on its surface because of the oil content.

The paste is also translucent, and may be dyed with a dye without interfering with this translucency. The difference in the colour tone of the paste and that of the article to be covered will often be very advantageous in enabling sharper contours to be obtained.

The paste according to the invention also serves as a protection against pickling agents. Finally, it may be used instead of paper for covering up very sensitive or polished surfaces, in which latter case it also offers the advantage of being impermeable to dust.

It has, furthermore, been found in practice that a considerable saving in time is effected when covering window panes or artificial glass panes by means of the paste according to the invention.

The application of the paste may be effected by means of a brush or by means of a spraying apparatus. Application with a spraying apparatus is only possible for example in protecting the side walls of spraying cubicles from being soiled, no sharp limitation of the surface to be covered up being required.

The paste can also be spread on to sheets of paper and thus applied in a fresh condition together with the paper to the parts to be covered. When dry the paper with the paste can be stripped off.

Finally the paste can be applied to paper and then dried. Before using the paper thus treated the same is moistened and then applied together with the paste to the parts to be covered. With a paper of this nature operations can be carried out very quickly.

What I claim is:

1. A protective covering paste to set on and to be peeled, as a continuous film, off an article to which it is applied and comprising methyl cellulose, liquid paraffin, glycerine and water.

2. A protective covering paste to set on and to be peeled, as a continuous film, off an article to which it is applied and consisting of methyl cellulose dissolved in water, a water-insoluble oil, glycerine, and a varnish serving as a hardening agent.

3. A soapless protective covering paste yielding a film adapted to be peeled off and containing by weight substantially 500 parts of a 1:14 solution of methyl cellulose in water, 160 parts of liquid paraffin and 7–140 parts of glycerine.

4. A soapless protective covering paste yielding a film adapted to be peeled off and containing by weight substantially 500 parts of a 1:14 solution of methyl cellulose in water, 160 parts of liquid paraffin, 140 parts of glycerine, and 40 parts of paraffin dissolved in an organic solvent and serving as a hardening agent.

5. A protective covering paper adapted to be peeled off an article to which it is applied and coated with a paste comprising methyl-cellulose dissolved in water as a film-forming substance, a water-insoluble oil, and glycerine.

RUDOLF KLOSE.